United States Patent
Zhou et al.

(10) Patent No.: US 7,507,499 B2
(45) Date of Patent: Mar. 24, 2009

(54) BATTERY PACK ARRANGEMENTS

(75) Inventors: Shijian Zhou, Rochester Hills, MI (US); Clinton Chandler Husted, Noblesville, IN (US); Frances A. Benjamin, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 622 days.

(21) Appl. No.: 10/852,560

(22) Filed: May 24, 2004

(65) Prior Publication Data
US 2005/0260488 A1 Nov. 24, 2005

(51) Int. Cl.
*H01M 2/10* (2006.01)
(52) U.S. Cl. .............................. 429/99; 429/96; 429/97; 429/98
(58) Field of Classification Search ................. 429/163; 180/68.5
See application file for complete search history.

(56) References Cited

U.S. PATENT DOCUMENTS

| | | | | |
|---|---|---|---|---|
| 5,558,949 A | * | 9/1996 | Iwatsuki et al. | 429/99 |
| 5,958,196 A | * | 9/1999 | Lubin et al. | 204/242 |
| 6,189,635 B1 | * | 2/2001 | Schuler et al. | 180/68.5 |
| 6,340,538 B1 | * | 1/2002 | King | 429/96 |
| 6,341,465 B1 | * | 1/2002 | Riegelman | 52/656.9 |
| 2004/0251596 A1 | * | 12/2004 | Csaszar et al. | 271/145 |

* cited by examiner

*Primary Examiner*—Patrick Ryan
*Assistant Examiner*—Cynthia Lee

(57) ABSTRACT

Battery packs are retained by frames which are comprised of plastic beams and aluminum corner connectors that peripherally surround the battery packs. The plastic beams are tensioned by tensioning bolts which pass through the aluminum corner connectors and thread into threaded pin inserts laterally seated in the beams. As the tensioning bolts are advanced into the inserts the beams are axially tensioned. Damping pads are disposed between the separate battery modules of the battery packs, as well as at the corners of the frames, to both absorb vibrational and spike impacts. The damping pads frictionally engage the outer surfaces of the battery cases so that the batteries will not move in the Z-axis direction.

21 Claims, 5 Drawing Sheets

BATTERY PACK ARRANGEMENTS

FIELD OF THE INVENTION

The present invention is directed to battery pack arrangements. More particularly, the present invention is directed to battery pack arrangements used in EV/HEV vehicles.

BACKGROUND OF THE INVENTION

Electric vehicles (EV) and hybrid electric vehicles (HEV) use battery packs comprised of several individual storage batteries that provide current to propel the vehicles and operate vehicle accessories. In at least one configuration, the modules are in two layers with a lower layer received in a generally rectangular case, and an upper layer positioned on a tray above the lower layer. A cover encloses the upper layer and is latched to the case. In order to stabilize the battery packs within the case and cover, the battery packs must be both laterally and vertically supported. This is usually accomplished by a compressive force applied to the top surfaces of the battery packs. Some designs stabilize the battery packs using a cover-pad-tray retention arrangement, while others utilize a rigid skeleton.

There is a need to minimize, at minimal cost, relative motion between battery modules within battery packs in order to reduce or eliminate interconnection failures that may occur within battery packs. As EVs and HEVs evolve, there is also a need to provide arrangements which allow for changes in design so that battery pack configurations may be more readily altered to accommodate vehicle design considerations.

SUMMARY OF THE INVENTION

In view of the aforementioned considerations, the present invention is directed to an arrangement for stabilizing in electric or hybrid electric vehicles at least one rectangular battery pack that includes an array of separate battery modules, wherein the battery pack has four side surfaces, a bottom surface and a top surface. The arrangement comprises a rectangular frame having four beams with each beam engaging one of the four sides of the battery pack. Four corner connectors are disposed at the ends of each beam to couple at right angles one beam to another. Tensioners are provided for positively connecting each corner connector to two beams. The tensioners draw the beams toward the corner connectors in order to clamp the battery modules in the battery pack against one another.

In still a further aspect of the invention, the beams each engage one of the four sides of the battery pack at a location spaced from the bottom surface of the battery pack, with a portion of each beam extending beneath the bottom surface of the battery pack, to support the battery pack adjacent to the periphery thereof on a supporting surface.

In a further aspect of the invention, damping pads are positioned between the battery modules of the battery pack.

In still a further aspect of the invention, the corner connectors are unitary bodies, each having a first pair of holes opening in directions normal to one another for receiving threaded fasteners therethrough. Axially extending threaded holes are provided in the beams to threadably receive the threaded fasteners to draw the beams toward the corner connectors as the threaded fasteners are rotated.

In a preferred embodiment, the threaded fasteners are threaded bolts and the threaded axial holes are in anchors disposed in the beams.

In a further aspect of the invention, the beams are made of plastic and the corner connectors of metal.

In still a further aspect of the invention, the frame is connected to a tray by fasteners.

In still a further aspect of the invention there are plural battery packs mounted on a single tray with each battery pack stabilized by a peripheral frame.

In still a further aspect of the invention, there is a middle frame flanked by two side frames. The middle frame has two beams which rest on two beams of the side frames.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
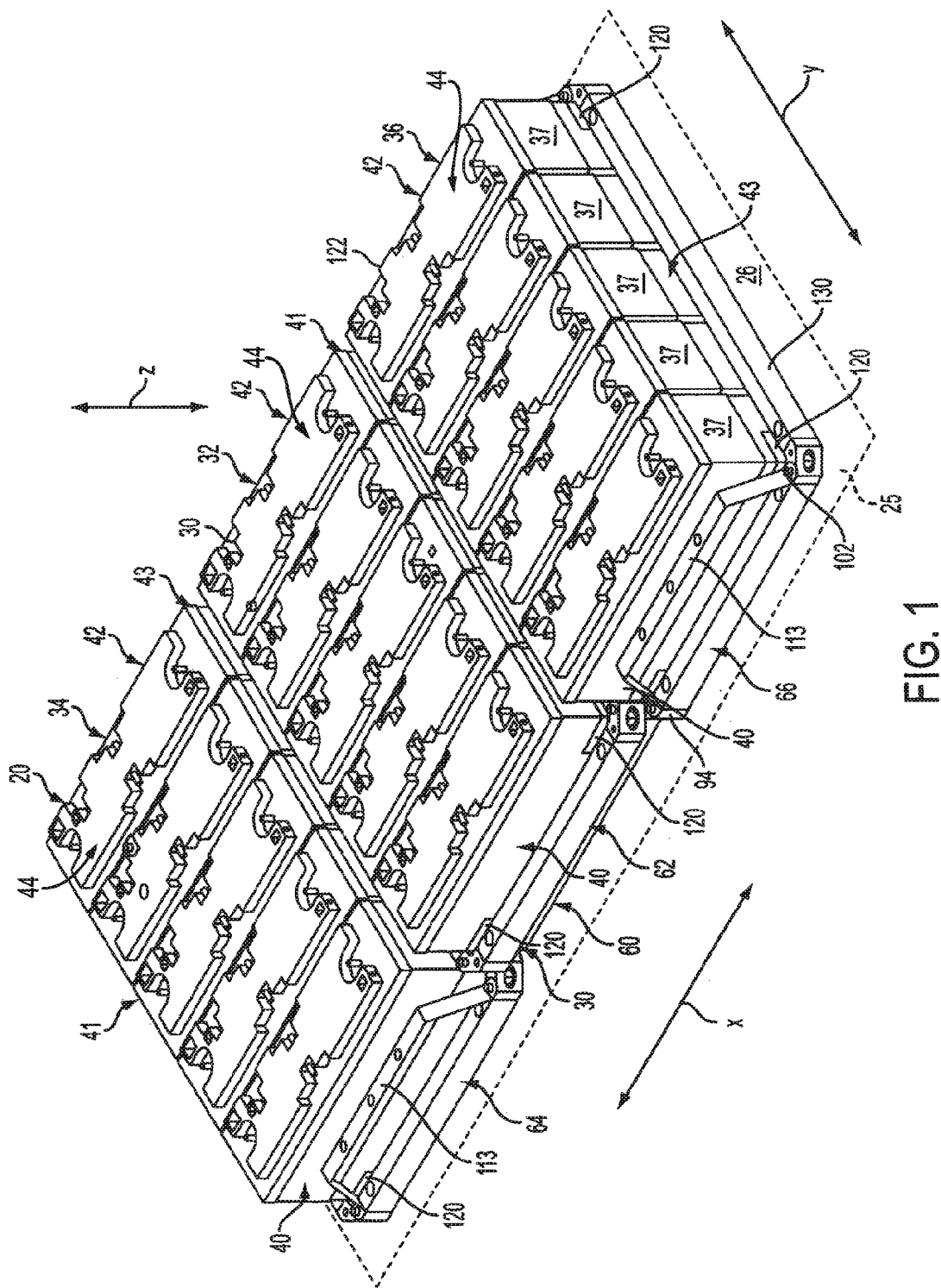
FIG. 1 is a top perspective view of EV/HEV battery pack arrangement configured according to the principles of the present invention.
Figure 2:
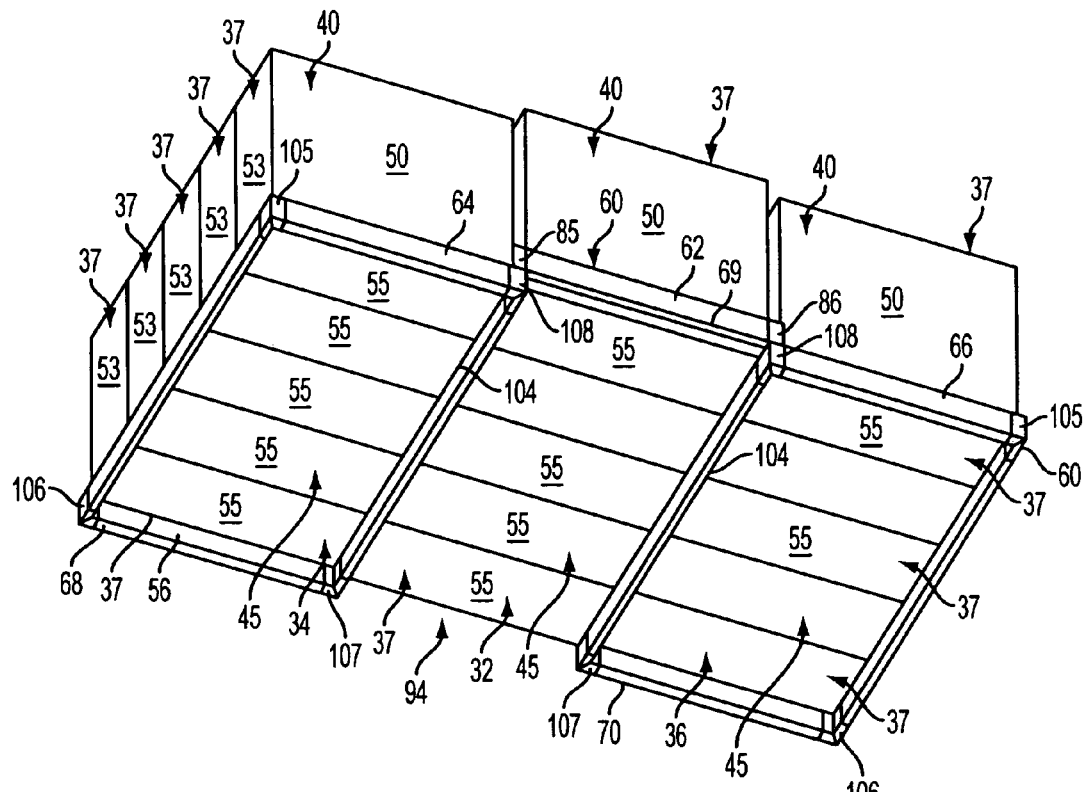
FIG. 2 is a bottom perspective view of the battery pack arrangement of FIG. 1.

Referring now mainly to FIGS. 1 and 2, a battery pack arrangement 20, configured in accordance with the present invention, is shown disposed on a tray 25 which provides a supporting surface 26 for the battery pack arrangement. The supporting surface 26 could also be provided by frame (not shown) that could be anchored to or be part of automotive vehicle structure.

A retention system 30 retains an inner battery pack 32 positioned between a first outer battery pack 34 and a second outer battery pack 36. In the illustrated embodiment, each of the battery packs 32, 34 and 36 includes five separate battery modules 37. Each of the battery packs 32, 34 and 36 has four sides 40, 41, 42 and 43, as well as a top surface 44 and a bottom surface 45.

Figure 3:
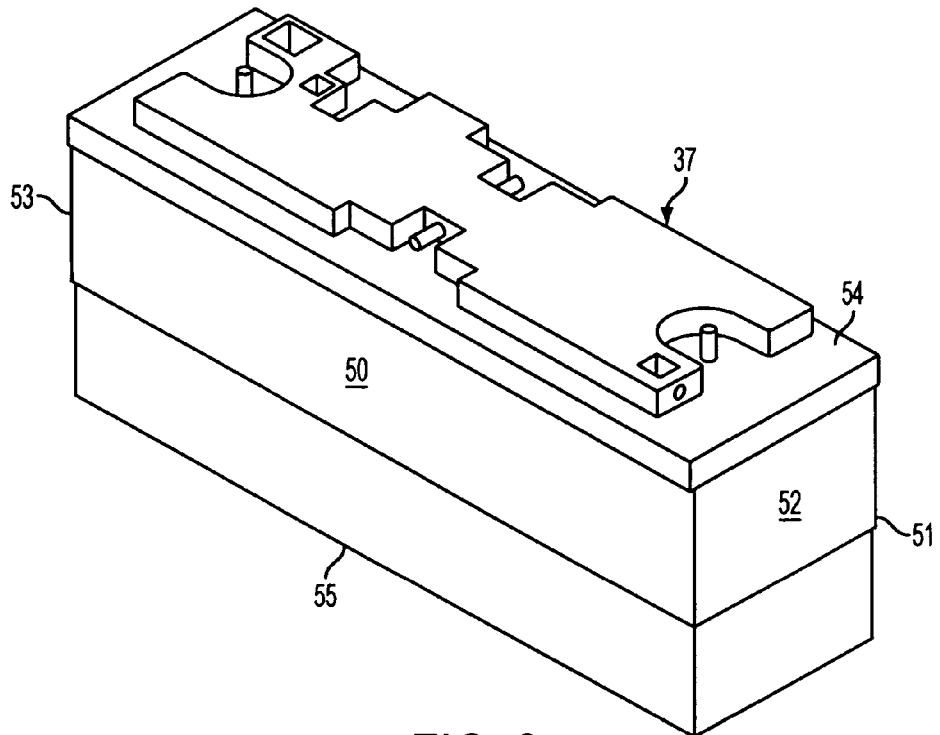
FIG. 3 is a perspective view of a single battery module which is assembled with other batteries to configure the battery pack arrangements of FIGS. 1 and 2.

As is seen in FIG. 3, each individual battery module 37 has a pair of long side surfaces 50 and 51 and a pair of short end surfaces 52 and 53, as well as a top surface 54 and bottom surface 55.

Figure 4:
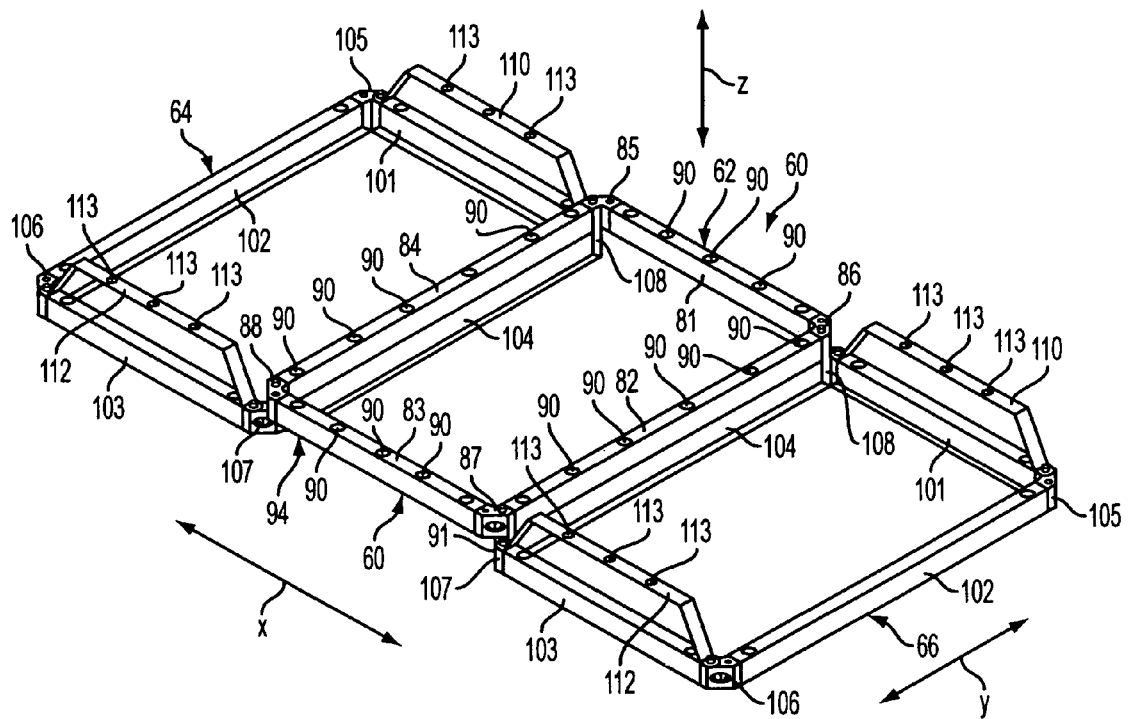
FIG. 4 is a perspective view of a framing arrangement used with the battery pack arrangement of FIGS. 1 and 2.

The battery pack arrangement 20 comprised of the battery packs 32, 34 and 36 utilizes a frame arrangement 60 shown separate from the battery packs in FIG. 4. The frame arrangement 60 is comprised of a middle frame 62, a first side frame 64 and a second side frame 66. As is best seen in the bottom view of FIG. 2, the two side frames 64 and 66 have bottom surfaces 68 and 70 which project beyond the bottom surfaces 45 of the battery packs 32, 34 and 36. Consequently, when the battery pack arrangement 20 rests on the tray 25 (FIG. 1), only the bottom surfaces 68 and 70 of the frame arrangement 60 abut the tray. This leaves the bottom surfaces 45 of each of the battery packs 32, 34 and 36, and thus the bottom surfaces 55 of each individual battery module 37, spaced from the tray 25. As is best seen in FIG. 2, the bottom surface 69 of frame 62 that is disposed around the middle battery pack 32 is preferably spaced from the bottom surface 45 of the middle battery pack 32. This keeps the top surfaces of all three battery packs at the same height from the surface 26 tray 25. As a result, pressure on the surface 26, as illustrated in FIG. 5 by the arrows 72, has a pressure distribution only at perimeters 74 and 75 of the battery packs 34 and 36.

Figure 5:
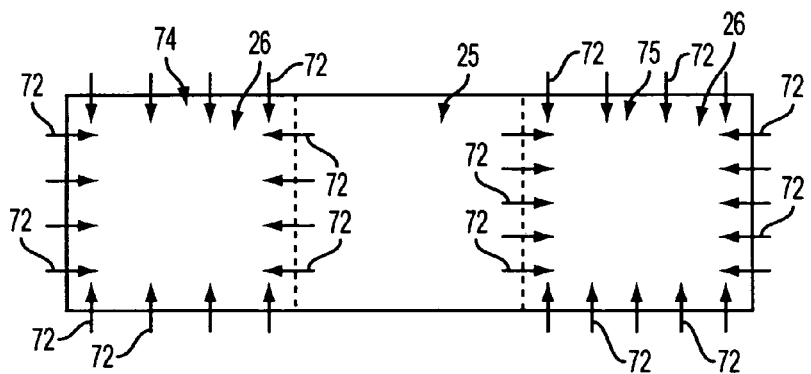
FIG. 5 is a schematic view of forces applied to a battery pack tray by the battery pack framing arrangement of FIGS. 1 and 2.

From FIG. 5 it is seen that the weight of the individual battery modules 37 has been transferred laterally through side surfaces 50 and 51 and the end surfaces 52 and 53 of the individual battery modules 37 to the frames 62, 64 and 66. Note from FIGS. 1 and 2 that the bottom surface 69 of the frame 62 retaining the middle battery pack 32 rests on the top surfaces of frames 64 and 66 so the middle battery pack 32 does not itself directly engage the surface 26 of the tray 25.

Figure 6:
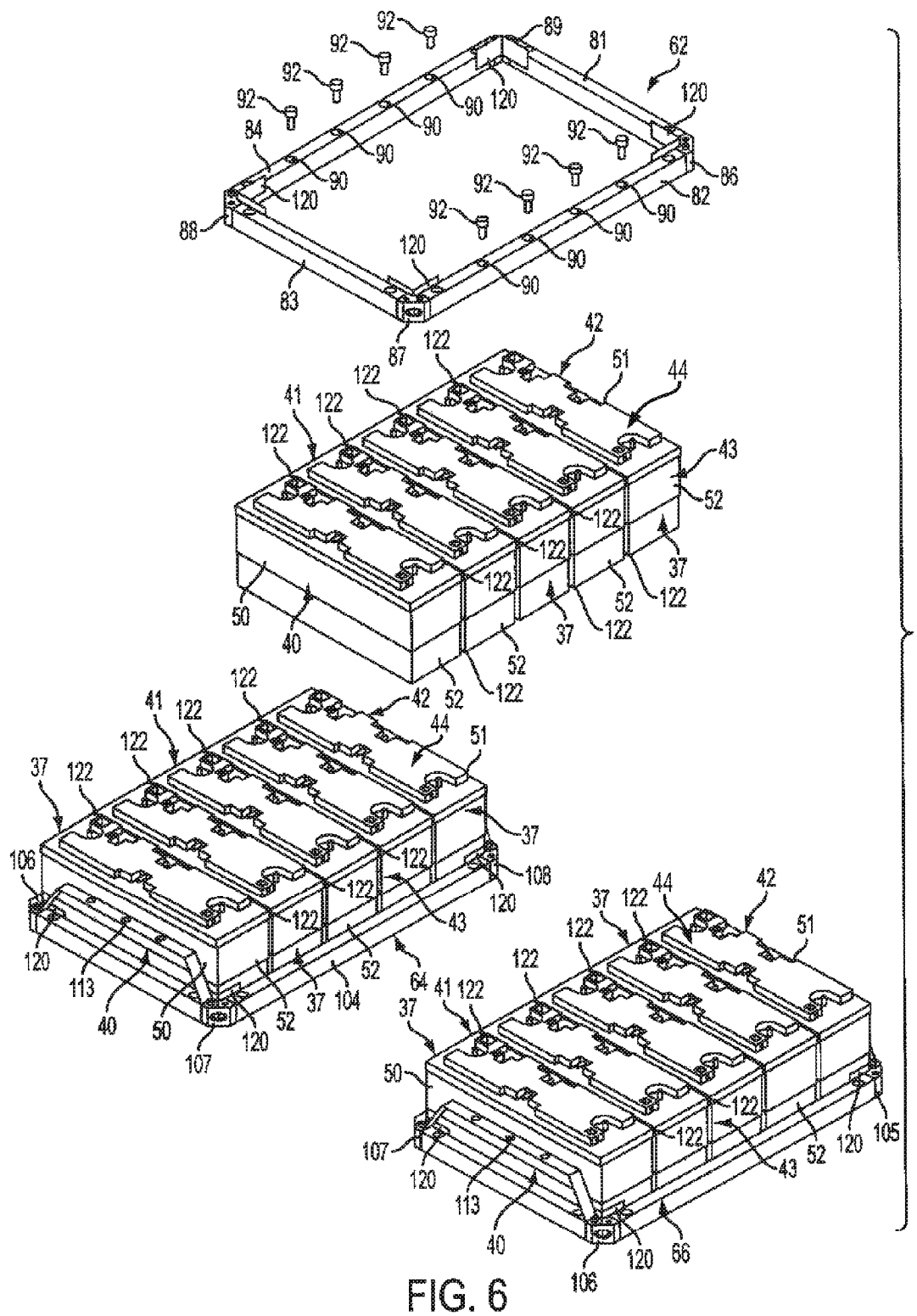
FIG. 6 is an exploded view of framing arrangement employed in FIGS. 1 and 2.
Figure 7:
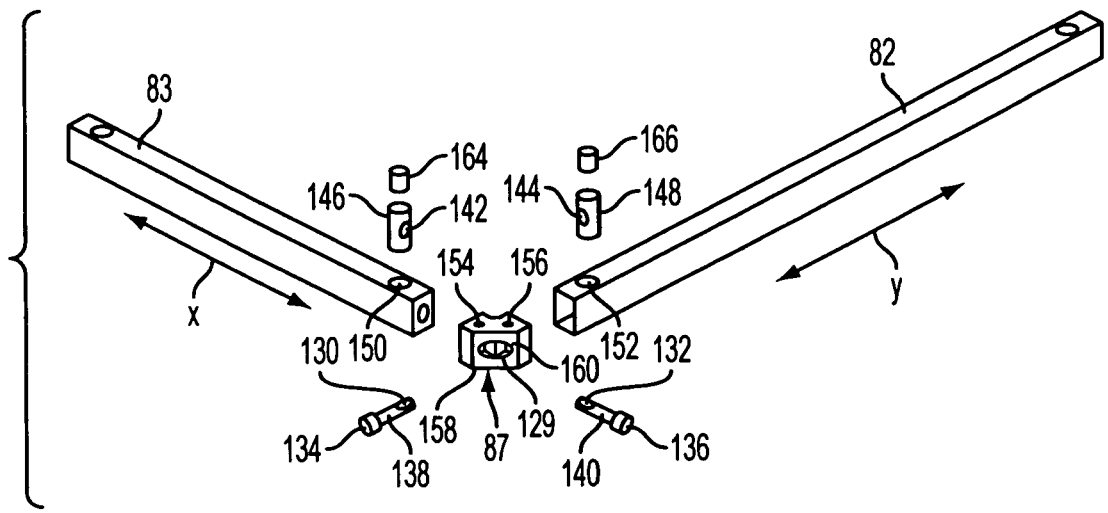
FIG. 7 is a perspective view of a portion of an intermediate frame used in the framing arrangement of FIG. 4.
Figure 8:
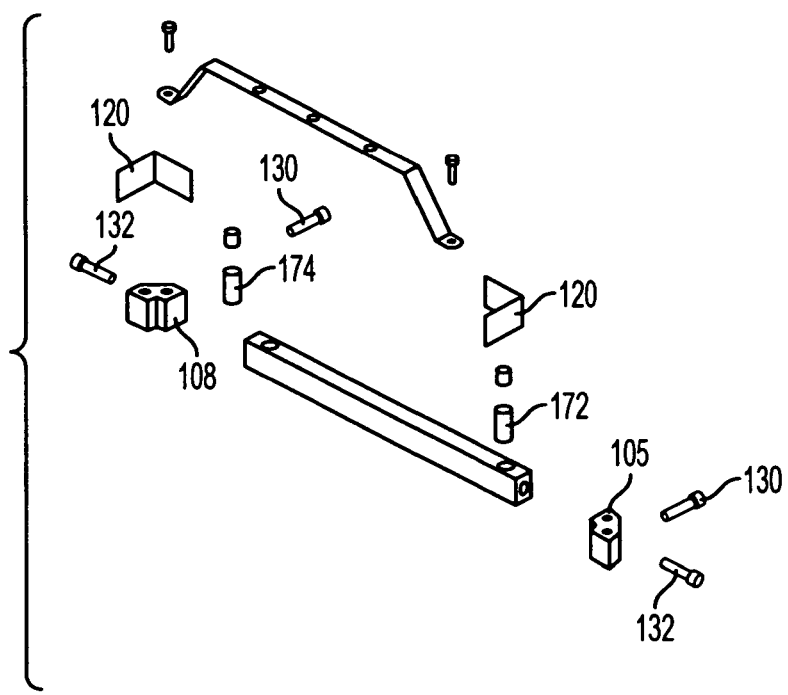
FIG. 8 is an exploded perspective view of a portion of the framing arrangement of FIG. 4.

The pressure pattern of FIG. 5 is further understood upon considering the structure of the frame arrangement 60 shown assembled in FIG. 4 and exploded in FIGS. 6, 7 and 8. As is seen in FIG. 4, the middle frame 62 has four beams 81, 82, 83 and 84, which are joined by four corner connectors 85, 86, 87 and 88 that are adjustable with respect to the beams. The beams 81-84 are preferably made of plastic, but may be made of metal or any other suitable material that may be tensioned. The corner connectors 85-88 are preferably made of a metal, such as aluminum or an aluminum alloy, but may be made of any other suitable, relatively rigid material. Bolt holes 90 extend downwardly through the beams 82 and 84 for anchoring the beams of the middle frame 62 with respect to the tray 25. The bolt holes 90 in beams 82 and 84 align with similar bolt holes in the frames 64 and 66 so that bolts 92 pass through into or through the frames 64 and 66.

The frames 64 and 66 which retain the outer battery packs 34 and 36 are substantially similar in configuration, each including four beams 101, 102, 103 and 104 and four corner connectors 105, 106, 107 and 108. As with the middle frame 62, the beams 101-104 of the outer frames 64 and 66 are preferably made of plastic, but may be made of other materials, such as metal, or any other suitable material which is tensionable. Like the previously discussed corner connectors 85-88, the corner connectors 105-108 are also preferably made of a metal such as aluminum or an aluminum alloy, but may be made of other suitable materials. The beams 102 of the frames 64 and 66 may be clamped to the tray 25 of FIG. 1 or may be bolted to the tray. The beams 101 and 103, as well as the beam 104 may also be bolted to the tray 25. If the tray is not structurally substantial enough itself to support the battery pack arrangement 20, the tray 25 has structural elements associated therewith to secure the beams 101-104. The beams 101 and 103 of the frames 64 and 66 may also be secured to the tray 25 by clamping or bolts. The frames 64 and 66 each have pairs of shallow U-shaped brackets 110 and 112 projecting from the beams 101 and 103 to which other structures such as covers (not shown) are attached via holes 113 therethrough.

As will be further explained hereinafter, each of the sets of side beams 81-84 and 101-104 are tensioned by the associated corner connectors 85-88 and 105-108, respectively. These tensionings squeeze the battery modules 37 together so that the sides surfaces 50 and 51 and end surfaces 52 and 53 of the battery casings form lateral supporting surfaces. In accordance with a preferred embodiment of the invention, L-shaped damping pads 120 (FIGS. 6 and 8) are disposed adjacent to each of the corner connectors 85-88 and 105-108. The L-shaped damping pads 120 bear against the beams 81-84 and 101-104 to provide relatively small pressure areas at the corners of the battery packs 32, 34 and 36 to urge the separate battery modules 37 of the battery packs 32, 34 and 36 laterally toward one another. Flat damping pads 122 are disposed between the exteriorly disposed batteries 37 of the battery packs 62, 64 and 66 and the interiorly disposed batteries 37 of the battery packs. Preferably, the flat damping pads 122 are positioned at the upper and lower corners of facing sides 50 and 51 of the battery modules 37. The damping pads 120 and 122 absorb vibration, as well as prevent movement of the modules in the upward and downward (Z-axis) direction with respect to one another. The damping pads 120 and 122 are made of a non-slip material so as to provide sufficient friction force to eliminate movement in the Z-axis direction and have sufficient resiliency to absorb vibrational impacts as well as spike impacts. While any suitable material for the damping pads may be used, preferable materials for the damping pads are plastics, such as NYLON®, polyphenyl sufones or polydicyclopentadienes.

Referring now to FIG. 7, where a portion of the frame 62 of the framing arrangement 60 is shown as an example, it is seen that two of the beams 82 and 83 are joined with a single corner connector 87. The corner connector 87 is relatively rigid with a cavity 129 therein while the beams 82 and 83 are elongated, rigid and may be tensioned. This is accomplished by threaded tensioning bolts 130 and 132 which have heads 134 and 136 which bear against interior wall surfaces of the corner connector 87. The tensioning bolts 130 and 132 have threaded shank portions 138 and 140 which are received in threaded bores 142 and 144 of retaining anchors 146 and 148 that are configured as pins inserted laterally into each of the beams 82 and 83.

Referring further just to FIG. 7, the beams 82 and 83 are telescoped with respect to the right angle portions 154 and 156 of the corner connector 87 in that the beams are mounted either into or around the right angle portions. Consequently, the beams 82 and 83 are pulled toward the corner connector 87 and tensioned with respect to the other adjacent corner connectors 88 and 86 shown in FIG. 4 and 6. The corner connector 87 has a diagonal wall 158 with an oval opening 160 into the cavity 129 therein that provides access for a bit of a tool (not shown) which engages and rotates the tensioning bolts 130 and 132 to drive the bolts into the threaded openings 144 and 142 in the retaining anchors 146 and 148 so that the bolts serve as tensioners when rotated. The retaining pins 146 and 148 are prevented from rotation because they are seated in the lateral bores 150 and 152. Spring biased plugs 164 and 166 keep the retaining anchors 146 and 148 properly aligned in the bores 150 and 152 so that the threaded holes 144 and 142 are oriented to receive the tensioning bolts 130 and 132. The corner connectors 85, 86 and 88 are substantially similar to, and preferably identical to, the corner connector 87. The tensioning bolts 130 and 132 of the corner connectors 85-88 are tightened after assembly of the frame 62 so that the frame 62 is drawn against the corner pads 120 (see FIGS. 6 and 8) in the X-axis and Y-axis directions to peripherally squeeze the battery modules 37 of the battery pack 32 towards one another. This also compresses the damping pads 120 and 122 disposed between the individual battery modules 37 of the battery packs 32, 34 and 36 to keep the individual battery modules stationary with respect to one another in the vertical or Z-axis direction.

As is seen in FIG. 8, the side frames 64 and 66 of the battery packs 34 and 36 are constructed and arranged in a substantially similar manner as the previously discussed middle frame 62. Each of the corner connectors 105-108 of the side frames 64 and 66 is secured by tensioning bolts 130 and 132 threaded into openings in anchors, which bolts serve as tensioners 172 and 174 to draw the beams 101-104 toward the corner connectors 105-108 so that each of the beams is drawn in opposite directions along either the Y-axis or the X-axis. The corners 105-108 are preferably configured to telescope with respect to the beams 101-104 so that the beams are drawn either into or over the corners. Thus, just as with the beams 81-84 of the frame 62, the beams 101-104 of the frames 64 and 66 peripherally tension around the battery packs 34 and 36, causing the damping pads 120 to squeeze the individual battery modules 37 toward one another. As with the previously discussed frame 62, compressing the damping pads 120 and 122 keeps the individual battery modules 37 from moving in the Z-axis direction due to frictional engagement of the damping pads with the side surfaces 50 and 51 of each of the battery modules.

The frames 64 and 66 retaining the battery packs 34 and 36 have bottom surfaces 68 and 70 that are disposed beyond the bottom surfaces of the battery packs 34 and 36 which results in pressure distribution pattern of FIG. 5. This feature is in addition to the arrangement provided by the frame 62, which in the illustrated embodiment of FIG. 1, does not project beyond the bottom surface 45 of the battery pack 32.

In the illustrated and preferred embodiment, there are three battery packs 32, 34 and 36 retained by separate frames 60, 62 and 64. However, there may be a single battery pack with more or fewer battery modules 37 than the five batteries shown in each of the battery packs 32, 34 and 36. Moreover, there may be framing arrangements with just two battery packs or framing arrangement with four or more battery packs, wherein the battery packs are nested together or separate.

In the illustrated arrangement, where there are three battery packs 32, 34 and 36, the frame 62 rests on the beams 104 of the adjacent frames 64 and 66 to save lateral space which would be the combined width of the two beams 104. This arrangement permits ease of assembly and lateral flexibility as well as allowing air flow both beneath the middle battery pack 32 and in gaps between the middle battery pack 32 and the first and second side battery packs 34 and 36. In addition, there is a relatively shallow space beneath the middle battery pack 32, through which a wiring harness or piping may extend in order to provide further design flexibility for EVs and HEVs as the technology evolves.

The battery pack retention system 30 of the present invention is relatively inexpensive and reliable while providing design flexibility by freeing battery pack retention structure from case and cover arrangements. This makes it easier to design and fabricate cases and covers for battery packs, because by using the present invention the cases, covers and trays primarily provide for environmental protection by isolating the battery modules from the surrounding environment. Consequently, low cost plastic may be used for the tray 25 and a cover (not shown) for the tray while thermoplastic material is used for the beams 81-84 and 101-104. The corner pieces 85-88 may be made from aluminum or other strong materials. Utilization of plastic beams and aluminum corner pieces minimizes tolerance issues with respect to reliability retaining the battery modules 37, as well as providing opportunities to use common parts in later designs and to apply effective manufacturing processes such as extrusion to make parts for mass production. Thus the battery pack arrangement 20 of FIG. 1 for EVs/HEVs reduces overall cost, delivery time and weight without compromising quality.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. An arrangement for stabilizing in an electric or hybrid electric vehicle at least one rectangular battery pack, wherein the battery pack includes an array of separate battery modules and has four side surfaces, a bottom surface and a top surface, the arrangement comprising:
   a rectangular frame having four beams, each beam engaging one of the four sides of the battery pack at a location adjacent to the bottom surface of the battery pack;
   four corner connectors disposed at ends of each beam to couple at right angles one beam to another; and
   tensioners positively connecting each corner connector to two beams and drawing the beams toward the corner connectors to thereby selectively compress the battery modules in the battery pack against one another.

2. The arrangement of claim 1 wherein there are damping pads positioned between the battery modules comprising the battery pack.

3. The arrangement of claim 2 wherein the frame of the battery pack extends beneath the bottom surface of the battery pack to support the battery pack on a supporting surface adjacent to the periphery of the battery pack.

4. An arrangement for stabilizing in an electric or hybrid electric vehicle at least one rectangular battery pack, wherein the battery pack includes an array of separate battery modules and has four side surfaces, a bottom surface and a top surface, the arrangement comprising:
   a rectangular frame having four beams, each beam engaging one of the four sides of the battery pack at a location adjacent to the bottom surface of the battery pack;
   four corner connectors disposed at ends of each beam to couple at right angles one beam to another;
   damping pads positioned between the battery modules comprising the battery pack; and
   tensioners positively connecting each corner connector to two beams and drawing the beams toward the corner connectors to thereby compress the battery modules in the battery pack against one another;
   wherein the corner connectors are unitary bodies each having a first pair of holes opening in directions normal to one another and the tensioners are threaded fasteners received through the openings; and
   threaded axial holes in the beams threadably receive the threaded fasteners to draw the beams toward the corner connectors as the threaded fasteners are rotated.

5. The arrangement of claim 4 wherein the threaded fasteners are threaded bolts and wherein the threaded axial holes are in anchors disposed in the beams.

6. The arrangement of claim 5 wherein the anchors are pins inserted laterally into the beams.

7. The arrangement of claim 6 wherein the pins are retained in the bores with spring stops.

8. The arrangement of claim 2 wherein the beams are made of plastic and the corner connectors are made of metal.

9. An arrangement for stabilizing in an electric or hybrid electric vehicle at least one rectangular battery pack, wherein the battery pack includes an array of separate battery modules and has four side surfaces, a bottom surface and a top surface, the arrangement comprising:
   a rectangular frame having four beams, each beam engaging one of the four sides of the battery pack at a location adjacent to the bottom surface of the battery pack;

four corner connectors disposed at ends of each beam to couple at right angles one beam to another;

damping pads positioned between the battery modules comprising the battery pack; and tensioners positively connecting each corner connector to two beams and drawing the beams toward the corner connectors to thereby compress the battery modules in the battery pack against one another;

wherein the beams are made of plastic and the corner connectors are made of metal; and wherein the corner connectors are unitary bodies each having a first pair of holes opening in directions normal to one another and the tensioners are threaded fasteners received through the openings; and threaded axial holes in the beams threadably receive the threaded fasteners to draw the beams toward the corner connectors as the threaded fasteners are rotated.

10. The arrangement of claim 9 wherein the threaded fasteners are threaded bolts and wherein the threaded axial holes are in anchors disposed in the beams.

11. The arrangement of claim 10 wherein the anchors are pins inserted into the beams.

12. The arrangement of claim 11 wherein the pins are retained in the bores with spring stops.

13. The arrangement of claim 12 wherein the supporting surface is a battery tray and wherein the beams have bottom surfaces spaced from the bottom of the module and facing the tray to support the frame and thus the battery pack on the tray.

14. The arrangement of claim 13 wherein fasteners couple the frame on the tray.

15. The arrangement of claim 14 wherein the fasteners extend through the beams to couple the frame to the tray.

16. The arrangement of claim 15 wherein the tray is plastic.

17. The arrangement of claim 16 wherein the tray and battery pack are covered by a plastic cover.

18. The arrangement of claim 3 wherein the supporting surface is a battery tray and wherein the beams have bottom surfaces facing the tray to support the frame and the battery pack on the tray.

19. The arrangement of claim 18 wherein there are plural battery packs mounted on a single tray.

20. The arrangement of claim 19 wherein a middle battery pack is disposed between outer battery packs, the middle battery pack having a first pair of parallel beams positioned on parallel beams of each of the two adjacent outer battery packs, the middle battery pack being engaged by a second pair of parallel beams extending perpendicular to the first pair of parallel beams.

21. The arrangement of claim 20 wherein fasteners extend through both the first pair of beams engaging the middle battery pack and the parallel beams of the outer battery packs to secure the middle and outer battery packs to the tray.

* * * * *